(12) United States Patent
Charmat

(10) Patent No.: US 6,533,079 B2
(45) Date of Patent: Mar. 18, 2003

(54) DISC BRAKE

(75) Inventor: Djamel Charmat, South Bend, IN (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/909,081

(22) Filed: Jul. 19, 2001

(65) Prior Publication Data

US 2003/0015381 A1 Jan. 23, 2003

(51) Int. Cl.⁷ .............................................. F16D 55/00
(52) U.S. Cl. .................. 188/73.31; 188/71.8; 188/73.44
(58) Field of Search .......................... 188/73.31, 73.35, 188/73.37, 73.44, 73.45, 71.8

(56) References Cited

U.S. PATENT DOCUMENTS

| | | | | |
|---|---|---|---|---|
| 4,191,278 A | * | 3/1980 | Karasudani | 188/73.39 |
| 4,279,331 A | * | 7/1981 | Lupertz | 188/71.8 |
| 4,436,186 A | * | 3/1984 | Ritsema et al. | 188/196 P |
| 4,887,696 A | * | 12/1989 | Redenbarger et al. | 188/196 P |
| 5,785,156 A | * | 7/1998 | Warwick et al. | 188/73.32 |
| 5,810,122 A | * | 9/1998 | Le Deit et al. | 188/73.45 |
| 5,934,416 A | * | 8/1999 | Maeda | 188/196 P |
| 6,397,983 B1 | * | 6/2002 | Roszman et al. | 188/71.8 |

* cited by examiner

Primary Examiner—Pam Rodriquez
(74) Attorney, Agent, or Firm—Leo H McCormick Jr.; Warren Comstock

(57) ABSTRACT

A guide pin (36,42) for caliper (16) of a disc brake assembly (10) having a first cylindrical body (102,202) having a first head (104,204) thereon secured to a second cylindrical body (112,212) having a second head (114,214) on a first end and a threaded section (116,216) that extends from a shoulder (120,220) to a second end. A resilient washer (110,210) is located between the second head (114,214) and an ear (38,44) on an actuation section (18) of the caliper (16). The threaded section (116,216) on the second end engages the first head (104,214) to bring the shoulder (120,220) into engagement with the first head (104,204) to secure the second cylindrical body (112,212) with the first cylindrical body (102,202) while compressing the resilient washer (110,210) between the second head (114,214) and the ear (38,44) to urge the first head (104,204) toward the ear (38,44) and the second head (114,214) away from the ear (38,44) such that an actuation force must first overcome a spring force of the resilient washer (110,210) before sliding movement of the caliper (16) occurs to effect a brake application and in that the spring force moves a friction member (34) out of engagement with a rotor (34) to a rest position on termination of a brake application.

4 Claims, 2 Drawing Sheets

DISC BRAKE

This invention relates to a disc brake and in particular resilient means that aids in moving a caliper with respect to a fixed support bracket after a brake application to establish a running clearance between an outer friction pad and a rotor.

BACKGROUND OF THE INVENTION

Disc brakes having first and second guide pins that are correspondingly retained in first and second bores in a support member fixed to the frame of a vehicle are known in the prior art. In such disc brakes, the support member receives the spaced apart first and second guide pins to allow the caliper to slide and allow corresponding first and second friction pads to engage with a rotor to effect a brake application. The following U.S. Pat. Nos. 4,448,287; 4,958,703; 4,976,339; 5,526,904; 5,749,445; 5,810,122; 5,810,112; 5,819,884 5,934,416 may be considered typical of such disc brakes. Basically during a brake application, the first and second guide pins slide in the first and second bores as a reaction to a force developed by pressurized fluid being presented to an actuation chamber that acts on an actuation piston to directly move the first friction member toward a rotor. The reaction force is received by the caliper and as a result moves a second friction member toward and into engagement with the rotor during the brake application. On termination the presentation of pressurized fluid to the actuation chamber, the first and second friction members move away from the rotor to establish a running clearance. If either the first or second friction members do not move away from the rotor brake, drag occurs which can cause undesirable wear of both the friction members and rotor. It is known to utilize the resiliency of a seal associated with the actuation piston to assist in the moving the first friction member away from the rotor. Unfortunately, the second friction member is not directly moved away from the rotor but must rely on knock back by the rotor to eliminate brake drag. Brake manufacturers have attempted to reduce brake drag by developing low slide force calipers, however, the components of current disc brakes require tight tolerance to maintain desired operational capabilities. Unfortunately, if such tolerances are not maintained, a perpendicular relationship between the guide pins and rotor is not achieved and caming can occur that causes pin binding that can result in high slide forces. It has been suggested that slide forces could be reduced by increasing the clearance tolerance between the guide pins and bores in the fixed support to provide for a free sliding structure. However, when this type structure was evaluated, noise was created as the pins rattled in the bores when the vehicle traveled on a road having an uneven surface. Rubber insulators that surrounded the guide pins were added to attenuate the noise created by the rattle, unfortunately, this solution reduced the free sliding ability of the caliper and as a result did not completely solve the problem.

SUMMARY OF THE INVENTION

A primary object of the present invention is to provide a disc brake having resilient means to assist in defining a running clearance between first and second friction members and a rotor after a brake application.

In more particular detail, the disc brake of this invention has a support member secured to a vehicle with spaced apart first and second bores for receiving corresponding first and second guide pins to position a caliper over a rotor. The caliper has an actuation section located on a first side of the rotor and an arm located on a second side of the rotor. The actuation section has an actuation bore therein for retaining a piston to define an actuation chamber and a bridge connected to an arm. A first friction member is associated with the piston and a second friction member is connected to the arm such that the first and second friction members are positioned on opposite sides of the rotor. The caliper has a first ear that extends from the actuation section for receiving a first head of the first guide pin and a second ear that extends from the actuation section for receiving a second head section of the second guide pin. The relationship between the first guide pin and first bore and second guide pin and second bore is to position the caliper over the rotor such that a parallel alignment is created between the first and second friction members with the rotor. In response to a desired braking of a wheel of the vehicle, the actuation chamber is presented with pressurized fluid from a source. Pressurized fluid, on being presented to the actuation chamber, acts on the piston to develop an actuation force that moves the piston and first friction member toward the rotor while at the same time creating a reaction force which acts on the actuation section and causes the caliper to slide on the first and second guide pins to move the second friction member toward the rotor and effect a brake application. The first and second guide pins are characterized by resilient means that must be overcome by the reaction force before sliding movement of the caliper occurs to effect the brake application and in that the resilient means later acts on the caliper to move the second friction member away from engagement with the rotor to a rest position on termination of the presented pressurized fluid from the source.

An advantage of this disc brake results in a positive caliper retraction on termination of a brake application.

An object of this invention is to provide a disc brake assembly with common and identical leading and trailing guide pins which do not require a bushing on the trailing pin and yet balanced wear for frictions linings is achieved.

DETAILED DESCRIPTION

Figure 1:
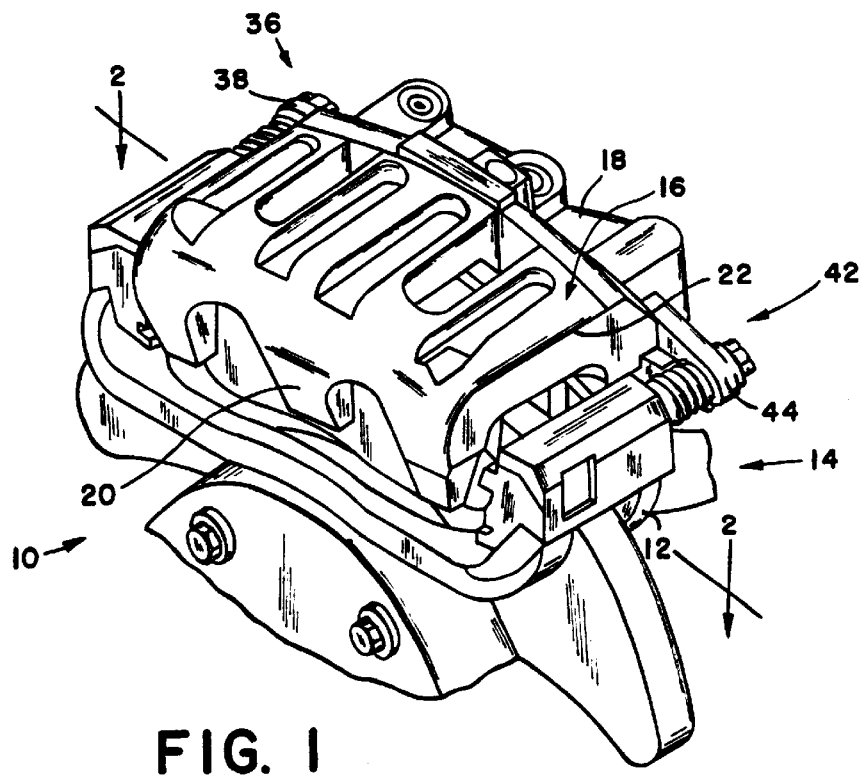
FIG. 1 is a perspective view of a disc brake made according to the principals of the present invention.
Figure 2:
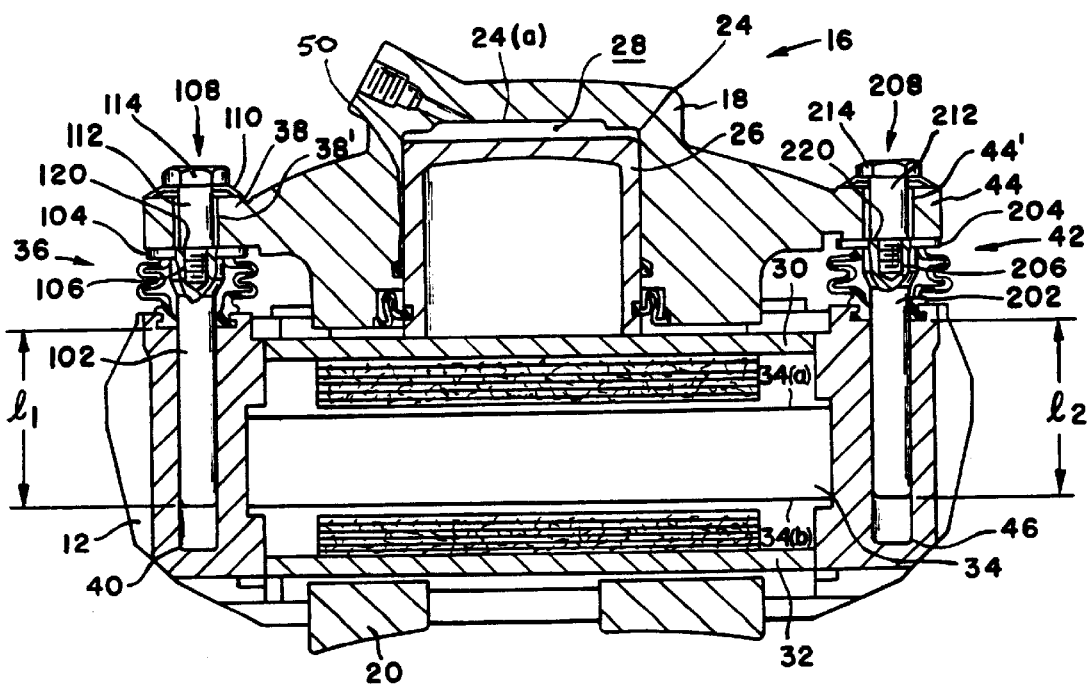
FIG. 2 is a sectional view of FIG. 1 taken along lines 2—2 illustrating a non-actuation position established between the friction pads, a support member and a rotor of the disc brake of FIG. 1 as created by first and second springs correspondingly acting on first and second guide pins that align the caliper over the rotor.

The disc brake 10 shown in FIGS. 1 and 2 is basically of a type known in the prior art, see U.S. Pat. No. 5,810,122, wherein an anchor or support member 12 is fixed to a housing 14, in a manner as disclosed in U.S. Pat. No. 5,988,761, for use in a brake system of a vehicle.

Disc brake 10 has an integral caliper 16 that includes an actuation section 18 that is connected by a bridge 22 to an arm 20. The actuation section 18 has a bore 24 therein for retention of a piston 26 to define an actuation chamber 28.

A first friction member 30 is connected to piston 26 while a second friction member 32 is connected to arm 20. The first 30 and second 32 friction members are respectively located adjacent a first face 34a and a second face 34b of a rotor 34 which is connected to rotate with an axle of the vehicle. A first guide pin 36 is connected to ear 38 that extends from the actuation section 18 and is mounted to slide in a first bore 40 in the support member 12. A second guide pin 42 is connected to ear 44 that extends from the actuation section 18 and is mounted to slide in a second bore 46 in the support member 12. The first 40 and second 46 bores are spaced apart, parallel, and designed to respectively hold the first guide pin 36 and the second guide pin 42 in a perpendicular relationship with respect to the rotor 34 such that the first friction member 30 and the second friction member 32 are held in corresponding planes respectively parallel with faces 34a and 34b on rotor 34.

In disc brake 10, the bearing support for the first guide pin 36 and second guide pin 42 is defined by an initial length "$I_1$ and $I_2$" and carries torque forces developed during a brake application from the caliper 16 into the support member 12. The cumulative bearing support "L" is defined by $I_1$ plus $I_2$ and initially $I_1$ and $I_2$ have equal length. During a brake application, a leading edge of each friction members 30 and 32, as defined by the rotation of rotor 34, first engage the rotor 34 and as a result introduce a rotational moment or force into caliper 16 which is part of the torque forces experienced during a brake application. It is a function of the first guide pin 36 and second guide pin 42 to maintain the first 30 and second 32 friction members in the respective parallel planes with the rotor to avoid un-even rotor wear from the leading to the trailing edges.

Figure 3:
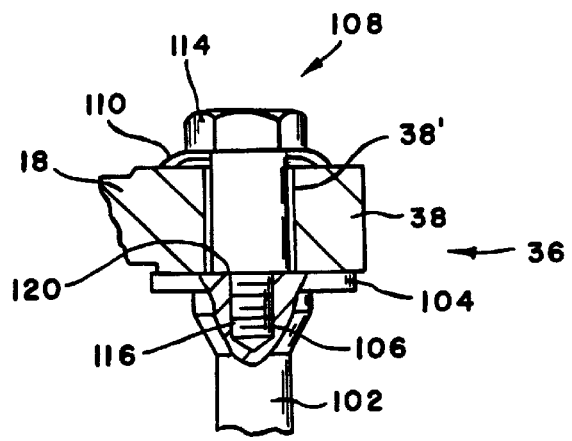
FIG. 3 is an enlarged view of a bolt for connecting a head of a guide pin with an ear of the caliper.

In more particular detail, the first guide pin 36 as best shown in FIG. 3, has a cylindrical body 102 with a first head 104 thereon and an axially threaded bore 106. A bolt 108 that extends through opening 38' in ear 38 is connected with the threads in bore 106 to locate or connect the first guide pin 36 with the caliper 16. Bolt 108 has a cylindrical body 112 with a head 114 on a first end and a threaded section 116 on a second end that extends from a shoulder 120 that separates the threaded section 116 from the smooth cylindrical body 112. A wave washer 110 is located between head 114 on bolt 108 and ear 38. A predetermined force is applied to screw bolt 108 into the threaded bore 106 until shoulder 120 is tight against head 104 on cylindrical body of the first guide pin 36. It should be understood that when bolt 108 is securely against head 104, wave washer 110 engages ear 38 in a snug manner but is in an extended position as illustrated in FIG. 3.

Similarly, the first guide pin 42 has a cylindrical body 202 with a first head or shoulder 204 thereon and an axially threaded bore 206. A bolt 208 that extends through opening 44' in ear 44 is connected with the threads in bore 206 to locate or connect the second guide pin 42 with the caliper 16. Bolt 208 has a cylindrical body 212 with a head 214 on a first end and a threaded section 216 on a second end that extends from a shoulder 220 that separates the threaded section 216 from the smooth cylindrical body 212. A wave washer 210 is located between head 214 on bolt 208 and ear 44. A predetermined force is applied to screw bolt 208 into the threaded bore 206 until shoulder 220 is tight against head 204 on cylindrical body of the first guide pin 42. It should be understood that when bolt 208 is securely against head 204, wave washer 210 engages ear 44 in a snug manner but is in an extended position as illustrated in FIG. 3 for guide pin 36.

The relationship between the cylindrical body 112 of the first bolt 108 and opening 38' and cylindrical body 212 of the second bolt 208 and opening 44' is such that the openings 38' and 44' are larger than cylindrical bodies 112 and 212 and as a result the caliper 16 can be aligned over the rotor 34 with the first 30 and second 32 friction members parallel to the faces 34a and 34b. The wave washers 110 and 210 correspondingly apply a continuing holding force to the first guide pin 36 and second guide pin 42 such that the first 36 and second 42 guide pins are held in a secure position without rattling and yet the resulting spring force is less than the sliding force developed by the actuation force during a brake application.

The resilient means is shown in the drawings and described in the specification as a wave washer (110,210) but could be replaced by any equivalent structure that would produce a similar spring force.

MODE OF OPERATION

Figure 4:
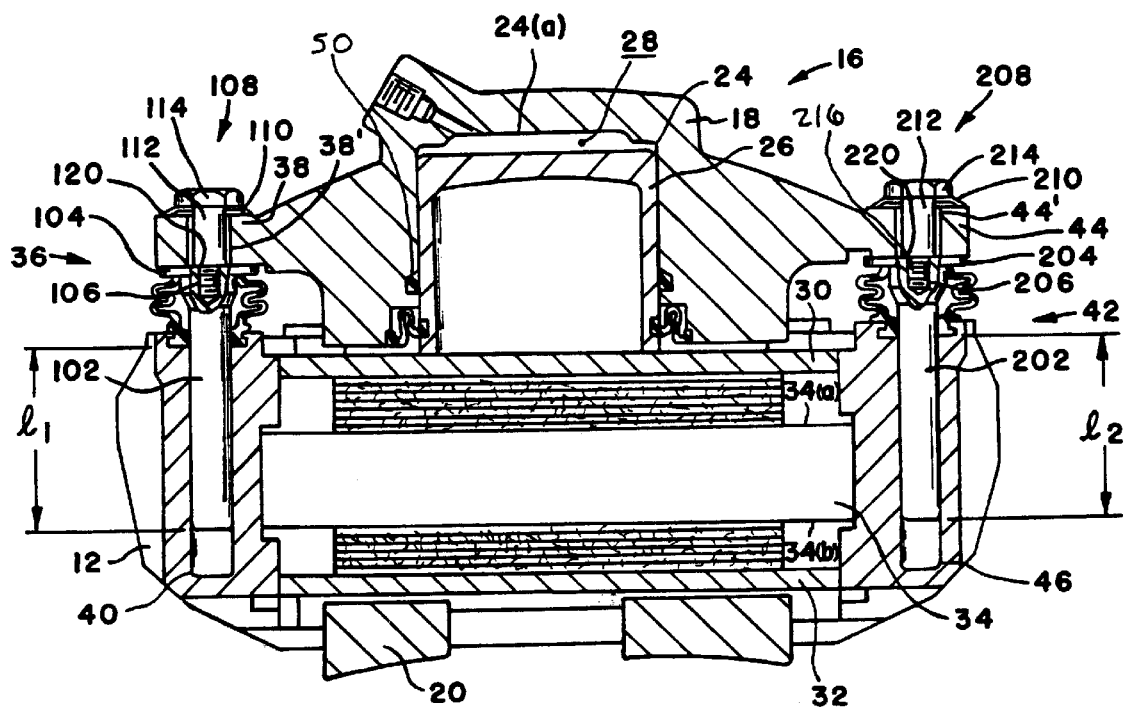
FIG. 4 is a sectional view of FIG. 1 taken along lines 2—2 illustrating an actuation position established between the friction pads, a support member and a rotor of the disc brake of FIG. 1.

When an operator desires to effect a brake application, pressured fluid is supplied to the actuation chamber 28 of bore 24. The pressurized fluid acts on piston 26 and actuation section 18 by way of the bottom 24a of bore 24, to develop an actuation force and a reaction force which moves the first friction member 30 into engagement with face 34a and the second friction member 32 into engagement with face 34b of the rotor, see FIG. 4, to retard the rotation of the rotor 34 and effect a brake application. However in the present invention, in order for the. reaction force, which is the same as the actuation force, to move the caliper 16 by sliding on the first guide pin 36 and second guide pin 42, the resilient force of wave washers 110 and 210 must first be overcome. Once this resilient force is overcome, the wave washers 110 and 210 collapse and only thereafter will movement of the arm 22 bring the second friction member 32 into engagement with face 34b on rotor 34. On termination of the supply of pressurized fluid to actuation chamber 28, seal 50 provides a force to move piston 26 and correspondingly the first friction member 30 away from face 34a and at the same time wave washers 110 and 210 act on ears 38 and 44 of the actuation section 18 to move the arm 20 to a rest position such that the second friction member 32 is retracted from face 34b to establish a desired running clearance with rotor 34 as illustrated in FIG. 2.

I claim:

1. A disc brake assembly (10) having a support member (12) secured to a vehicle, a caliper (16) having an actuation section (18) connected by a bridge (22) to an arm (20), said actuation section (18) having an actuation bore (24) therein for retaining a piston (26) to define an actuation chamber (28), a first friction member (30) is connected to said piston (26) while a second friction member (32) is connected to said arm (20), said caliper (16) having a first ear (38) and a second ear (44) extending from said actuation section (18), said first ear (38) receiving a head section (104) of a first guide pin (36) located in a first bore (40) and said second ear (44) receiving a second guide pin (42) located in a second bore (46) of said support member (12) to define first and second bearing surfaces that align said caliper (16) over a rotor (34) associated with a wheel of the vehicle, said actuation chamber (28) being presented with pressurized fluid from a source that acts on said piston (26) to develop an actuation force for moving said piston (26) and first friction member (30) toward said rotor (34) and on said actuation section (18) that causes said caliper (12) to slide on said first (36) and second (42) guide pins and move said second friction member (32) toward said rotor (34) to effect a brake application, said first (36) and second (42) guide pins each being characterized by a first cylindrical body (102, 202) with a first head (104,204) thereon, a second cylindrical body (112,212) with a second head (114,214) on a first end and a threaded section (116,216) that extends from a shoulder (120,220) to a second end and resilient means (110,210) located between said second head (114,214) and one of said ears (38,44) on said actuation section (18), said threaded section (116,216) on said second end engaging said first head (104,214) to bring said shoulder (120,220) into engagement with said first head (104,204) to secure said second cylindrical body (112,212) with said first cylindrical body (102,202) while compressing said resilient means (110,210) between said second head (114,214) and said one of said ears (38,44) to urge said first head (104,204) into engagement with said one of said ears (38,44) and said second head (114,214) away from said one of said ears (38,44) such that said actuation force must first overcome a spring force of said resilient means (110,210) to move said first head (104,204) out of engagement with said one of said ears (38,44) before sliding movement of said caliper (16) occurs to effect said brake application and in that said spring force urges said first head (104,204) into engagement with said one of said ears (38,44) and correspondingly said second friction member (34) away from engagement with said rotor (34) to a rest position on termination of the presented pressurized fluid from said source.

2. The disc brake assembly (10) as recited in claim 1 wherein said first head (104,204) is characterized by engaging said one of said ears (38,44) to assist in aligning said first (32) and second (34) friction members with respect to said rotor (34).

3. The disc brake assembly (10) as recited in claim 2 wherein said resilient means is characterized by a spring washer (110,210) located between said head (114,214) of said bolt (108,208) and said one of said ears (38,44).

4. The disc brake assembly (10) as recited in claim 3 wherein said resilient means is characterized in that an actuation force required to slide said caliper (16) on said first (36) and second (42) guide pins is higher than said spring force defined by said spring washer (110,210).

* * * * *